May 27, 1969
G. WINTRISS
3,446,063
MACHINE LOAD INDICATOR WITH ADJUSTMENT FOR SPEED
Filed Feb. 9, 1967
Sheet 2 of 2
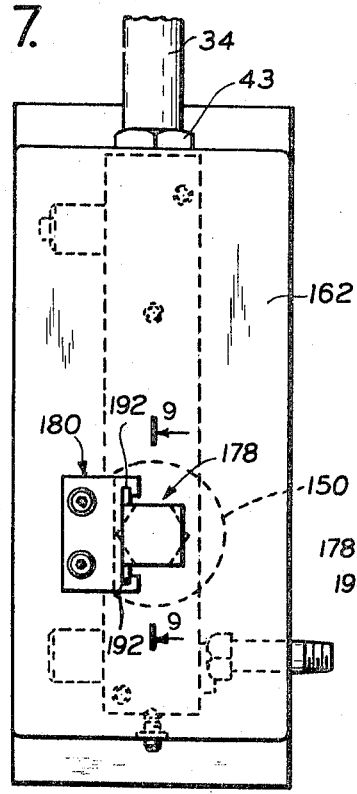
FIG. 7.
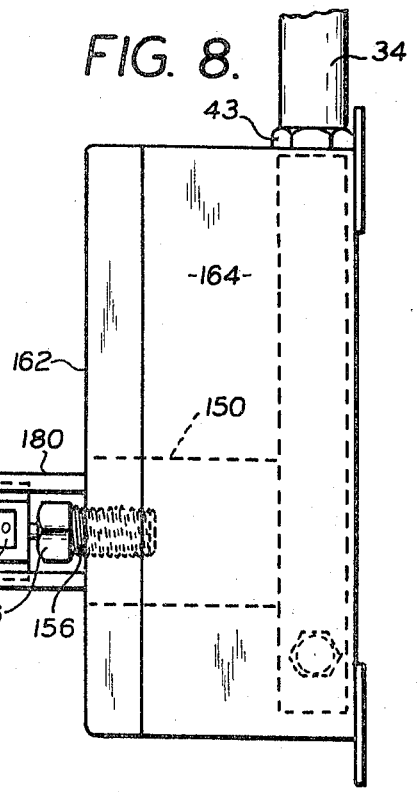
FIG. 8.
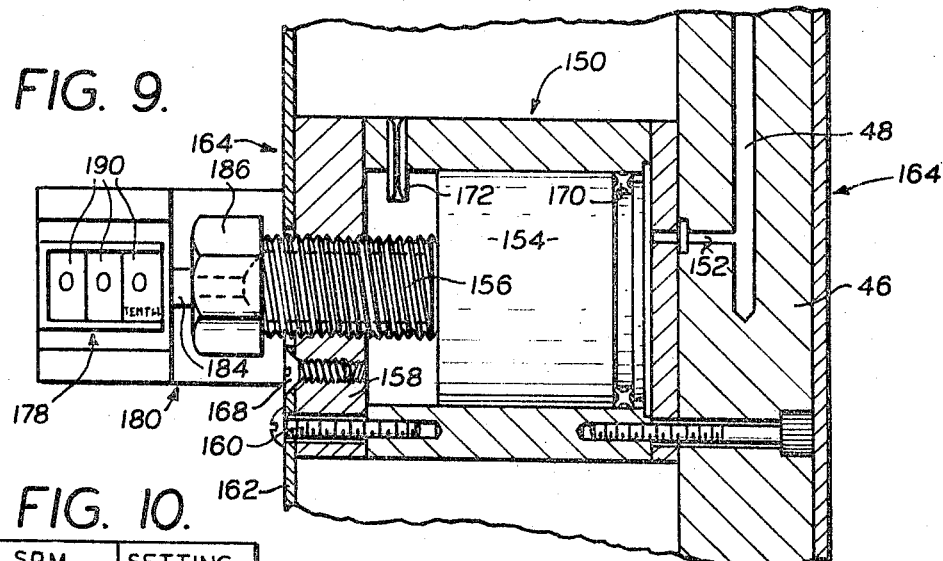
FIG. 9.
FIG. 10.
| S.P.M. | SETTING |
|---|---|
| 200 | 0 |
| 175 | .5 |
| 150 | 1.0 |
| 125 | 1.5 |
| 100 | 2.0 |
INVENTOR
George Wintriss
BY Sandoe, Neill,
Schottler & Wilkstrom
ATTORNEYS.

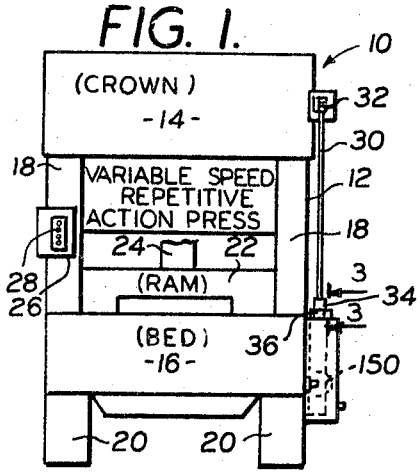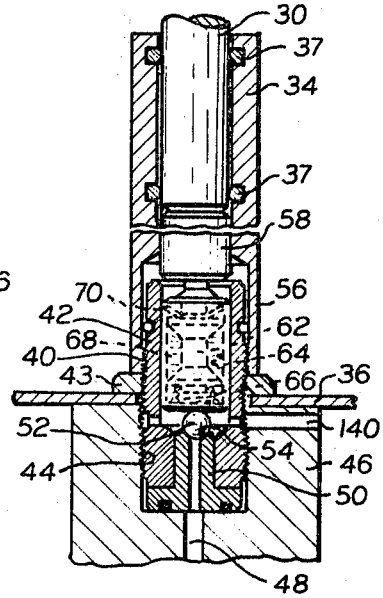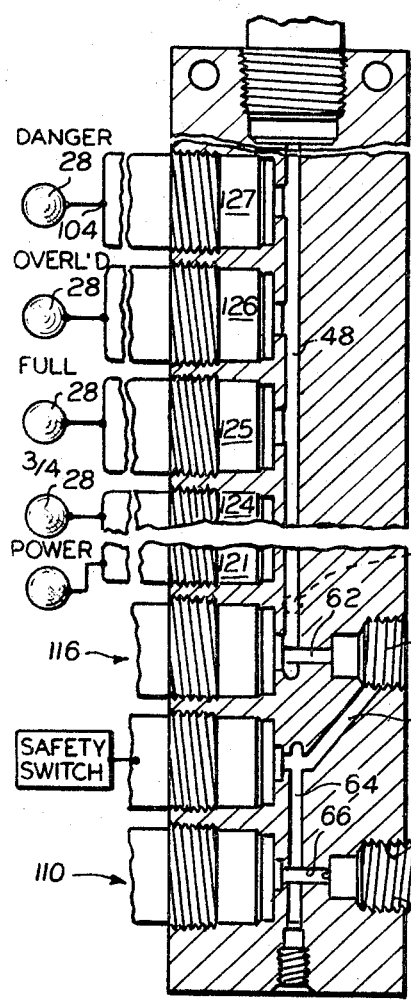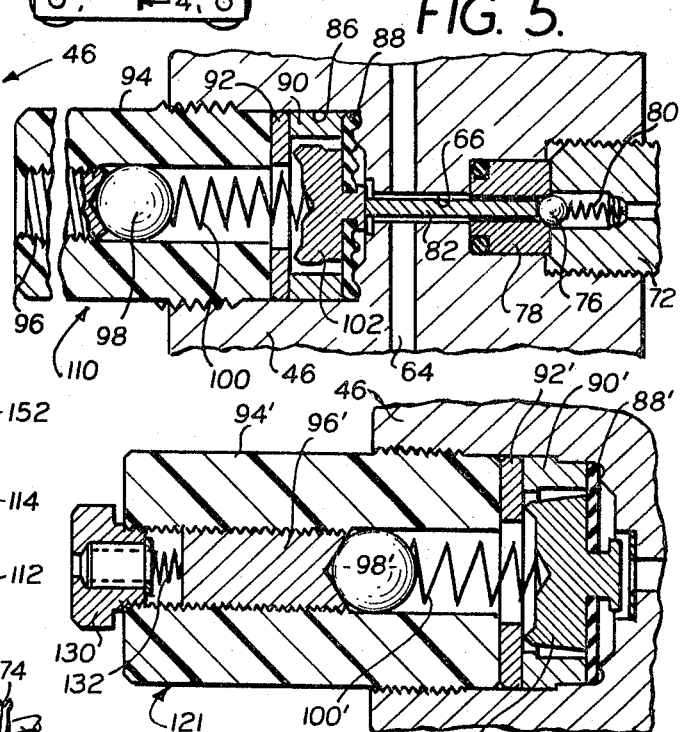

United States Patent Office 3,446,063
Patented May 27, 1969

3,446,063
MACHINE LOAD INDICATOR WITH
ADJUSTMENT FOR SPEED
George Wintriss, Carversville, Pa., assignor to Industrionics Controls, Inc., New York, N.Y., a corporation of New York
Filed Feb. 9, 1967, Ser. No. 614,945
Int. Cl. G01n 3/02
U.S. Cl. 73—88                                    11 Claims

ABSTRACT OF THE DISCLOSURE

This invention relates to apparatus for indicating the load on a press or other machine. The invention has a self-compensating motion-transmitting connection that is responsive to the elongation of the frame of the machine when subjected to different loads. The motion is used to control a fluid flow which effects pressure to give a read-out without the use of electronic amplification. This invention is especially concerned with compensation of such a system for changes in the speed of the machine.

BRIEF SUMMARY OF THE INVENTION

The invention provides improved means for indicating the mechanical load on a machine and for warning a user of increases in loads beyond the safe operating limits of the machine. The preferred embodiment of the invenion is a standardized apparatus that can be used on machines of different capacity and the indicating means are calibrated to designate full load and fractions thereof without specifying the actual load in units of force. The important function of the apparatus is to indicate change of load during repetitive operations since such a change is significant of malfunctioning, and to indicate when the machine, in operating on new work, is within its safe limits of capacity.

The invention provides an improved apparatus responsive to the mechanical load on a machine and uninfluenced by changes in temperature; and which does not require critical setting of the relatively moveable parts that indicate changes in the load.

In the preferred construction, the system is electro-pneumatic and there are electric switches operated by changes in pressure of air or other fluid. The pressure variations serve to amplify the minute changes in the position of parts of the machine which move with respect to one another with changes in the load on the machine.

An important feature of the invention is its means for adjustment to compensate for differences in the speed at which a repetitively operating machine is running. This is necessary because, while the displacement of a part may be substantially the same at the same load regardless of the speed of operation, the length of time that the part remains displaced and the resulting fluid pressure change increases as the speed of operation of the machine decreases. Where the invention utilizes the change in rate of flow of a fluid in response to displacement, it is practical to use the same apparatus at different speeds by merely adjusting the volume of the space from which fluid escapes.

Other objects, features and advantages of the invention will appear or be pointed out as the description proceeds.

BRIEF DESCRIPTION OF THE DRAWING

In the drawing, forming a part hereof, in which like reference characters indicate corresponding parts in all the view;

FIGURE 1 is a diagrammatic view of a variable speed repetitive-action press equipped with this invention;

FIGURE 2 is a greatly enlarged view of the indicator panel shown on the press of FIGURE 1;

FIGURE 3 is a greatly enlarged sectional view at the section line 3—3 of FIGURE 1;

FIGURE 4 is a greatly enlarged, diagrammatic sectional view of the manifold and showing the correlation of the switches, regulators, and other parts of the apparatus shown in FIGURE 1;

FIGURE 5 is a greatly enlarged sectional view of one of the regulators shown in FIGURE 4;

FIGURE 6 is a greatly enlarged sectional view of one of the switches shown in FIGURE 4.

FIGURE 7 is a front view, on a greatly enlarged scale, of the manifold housing as shown in FIGURE 1;

FIGURE 8 is a side elevation of the manifold housing of FIGURE 7;

FIGURE 9 is a greatly enlarged sectional view on the line 9—9 of FIGURE 7; and

FIGURE 10 is a table showing the setting for the volume adjustment for different speeds of the machine.

DETAILED DESCRIPTION OF THE INVENTION

FIGURE 1 shows a press 10 having a frame 12 which includes a crown 14 and a bed 16 connected to one another by side frames 18 which extend downwardly as parts of legs 20 of the press frame. A ram 22 is moved toward and from the bed 16 in accordance with conventional practice. Motion is transmitted to the ram 22 by motion-transmitting means 24 which are operated by an eccentric, cam, or crank depending upon the type of press.

The invention includes a panel 26 mounted on a part of the frame of the press, or at some other convenient location, with indicators or signals 28 for conveying information to the operator of the press concerning the load on the press, and other information, such as the power supply and the pressure for operating the switches.

The press 10 may be operated through a single stroke, and the indicators 28 on the panel 26 will supply information during this single stroke operation. The greatest utility of the invention, however, is when the press 10 is being operated as a repetitive action press, during which operation the indicators 28 show the load during each cycle of operation and also supply information of any change in the load. For example, if during a number of repetitive cycles, the load on the press has been one-half of the maximum safe load, and then during the next cycle the maximum load suddenly becomes three-quarters instead of one-half, this is an indication of malfunctioning, such as a failure of the press to eject a workpiece or failure in the feeding of strip material which may be supplied to the press in increments.

When the ram 22 is thrust against the bed 16 with each operation of the press 10, the force of the motion transmitting means 24 produces an elongation of the side frames 18, and this invention is responsive to the elongation of the frame. In the preferred construction, illustrated in the drawing, the response to frame elongation is obtained by having a rod 30 secured to the crown 14 by a connection 32. The lower end of the rod 30 fits into a guide 34 which is secured to the lower part of the frame 12 by a bracket 36.

The rod 30 has no connection with the guide 34, but is free to slide axially in the guide 34 and does so to the extent that the upper end of the rod 30 moves with respect to the lower portion of the machine frame to which the bracket 36 is connected. FIGURE 3 shows the rod 30 extending into the guide 34 which provides a bearing for the lower part of the rod 30; and there are seals, such as O-rings 37 for preventing the entry of dirt or other foreign matter into the lower part of the guide 34 as the rod 30 moves axially during the operation of the press.

The lower end of the guide 34 has threads 40 that screw over a connector 42 and there is a lock nut 43 on the connector 42 in contact with the end face of the guide 34. The connector 42 extends through an opening in the bracket 36, and the lower end of the connector 42 threads into a counterbore 44 in the upper end of a manifold block 46. The nut 43 and the manifold block 46 clamp against opposite sides of the bracket 36. The manifold block 46 has a fluid chamber including a passage 48 extending lengthwise of the block, and the passage 48 is in substantially axial alignment with the connector 42.

A seat element 50 is clamped between the lower end of the connector 42 and the bottom of the counterbore 44 in the upper end of the passage 48. There is a passage through the seat element 50 forming a continuation of the passage 48. A ball valve 52 is located on a seat 54 at the upper end of the seat element 50. The ball valve 52 is normally held in contact with the seat 54, to prevent the escape of air from the passage 48, by the rod 30 and by a position sensor 56 and a magnet 58 interposed between the ball 52 and the lower end of the rod 30.

The position sensor 56 is cylindrical and slides freely in the connector 42 as a guide. The magnet 58 is attracted to the rod 30 and also to the position sensor 56 so that the position sensor 56 rises and falls with displacement of the lower end of the rod 30. The position sensor 56 has a solid bottom which rests on the ball valve 52.

A piston rod 60 extends from the upper end of the position sensor 56 for a short distance. The rod 60 is connected with a piston 62 which is movable axially in a cylindrical chamber 64 enclosed within the housing of the position sensor 56. A spring 66 urges the piston 62 and rod 60 upward so as to extend the length of the position sensor 56. The spring 66 compresses, or expands as necessary, so that the position sensor 56 always fills the space between the magnet 58 and the ball valve 52 when the valve is in closed position.

There is a viscous fluid 68 in the chamber 64 for resisting upward movement of the piston 62. The upper end of the chamber 62 is closed by diaphragm 70. By the choice of viscosity of the fluid 68, the rate of change of length of the position sensor 56 can be made as slow as desired.

Thus the position sensor 56 expands to the extent necessary to exactly fill the space between the magnet 58 and the ball valve 52, or between the rod 30 and the ball valve 52, if no magnet 58 is used in the assembly. The invention can be operated without the magnet 58 and in such installations the air pressure under the ball valve 52 is used to lift the position sensor 56 when the rod 30 moves upward in response to elongation of the frame of the press.

The viscosity of the fluid in the position sensor 56 is chosen so that there is no substantial elongation of the position sensor 56 during the period of the press cycle during which the lower end of the rod 30 lifts in response to elongation of the frame of the press. Any extension of the position sensor 56 that does occur during an operating cycle of the press is cancelled out by the return of the rod 30 to its original position at the end of the press cycle. The position center does change in length one way or the other as is necessary to accommodate temperature changes and other "long term" changes in the relation of the parts of the press with respect to one another.

At most, the elongation of the position sensor is at a rate substantially less than that at which the rod 30 moves with respect to the seat element 50 during a cycle of operation of the press.

When there is no load on the press, the valve 52 is held closed against its seat 54 by the downward thrust of the position sensor 56. The spring 66 in the position sensor is strong enough to hold the valve 52 closed against the seat 54 at the maximum fluid pressure that is used in the passage 48 of the manifold block 46.

FIGURE 4 shows the manifold block 46 in section. Passage 48 extends downward to a cross passage 62. There is another manifold block passage 64 in substantial alignment with the passage 48 but in a lower portion of the block. A lower cross passage 66 communicates with the lower passage 64 and there is a plug 68 screwed into a counterbore at the lower end of the passage 64. The passages 62, 64 and 66, and all of the other spaces that communicate with the passage 48 are part of the fluid chamber of the system. Air or other fluid is supplied to the passages in the manifold block 46 at superatmospheric pressure, through tubing 70 leading from a compressor or pressure tank to a fitting 72 that threads into a counterbore 74 at the right hand end of the cross passage 66.

Within the fitting 72 there is a valve chamber that houses a valve element 76 (FIGURE 5) shown as a ball, and this ball valve 76 is urged against a tapered seat 78 by a spring 80. The valve 76 is normally held in open position by a rod 82 extending along the passage 66 as a guide but of different cross section from the passage so as to leave clearance for the flow of fluid through the passage. This passage 66 extends through the passage 64, substantially normal to it, and into another chamber 86 formed by a counterbore that is at the opposite end of the passage 66 from the fitting 72.

The chamber 86 is divided into two parts by a flexible diaphragm 88. The periphery of this diaphragm is clamped between a recessed end of the chamber 86 and the end of a ring 90. This ring 90 is clamped by a washer 92 under pressure from a bushing 94 made of electrical insulating material and screwed into threads in the end of the counterbore that forms the chamber 86. The center of the bushing 94 is closed by plug 96 threaded into the bushing. A ball 98 is held by the inner end of the plug 96 in contact with one end of a spring 100 and the other end of the spring presses against a metal contact element 102.

The periphery of the metal contact element 102 extends outward behind the inner part of the washer 92 and is connected with the diaphragm 88 which holds the contact element 102 centered axially in the chamber. The contact element 102 has a rim near its periphery for contact with the washer 92 which serves as a stop for the element 102 and the diaphragm 88 when there is pressure on the right hand side of the diaphragm 88 sufficient to overcome the spring 100.

The structure shown in FIGURE 5 is the first stage of two stage regulation provided for the air (or other fluid) supplied to the manifold block 46. Air flows through the fitting 72 and around the ball valve 76 until the pressure in the passage 64, and the communicating portion of the chamber 86 on the right hand side of the diaphragm 88, increases to a value which is sufficient to move the diaphragm 88 toward the left in FIGURE 5 and against the pressure of the spring 100 so that the ball valve 76 is closed by the pressure of the spring 80. This is in accordance with conventional pressure regulating equipment; and whenever the pressure in the passage 64 decreases sufficiently to permit the spring 100 to overcome the pressure on the right hand side of the diaphragm 88 and the pressure of the spring 80, the diaphragm 88 moves the rod 82 towards the right in FIGURE 5 and opens the ball valve 76 so that additional air flows into the passage 64 until the desired passage pressure is again obtained. The pressure which this regulator mechanism will maintain in the passage 64 depends upon the force of the spring 100; and this force is adjustable by screwing the plug 96 one way or the other in the threads of the bushing 94. This pressure regulator, shown in FIGURE 5, is designated generally by the reference character 110 in FIGURE 4.

At the upper end of the passage 64, there is a sloping passage 112 which leads into a counterbore at the end of the cross passage 62; and there is a plug 114 screwed into the end of this counterbore of the cross passage 62. This sloping passage 112 introduces air from the first stage regulator 110 into a second stage regulator 116 which is preferably of similar construction to the first stage regulator 110; but which regulates the pressure of air in the upper passage 48.

Along the course of the passage 48 there are a number of fluid operated switches; one for each of the indicators 28 (FIGURE 2). In the illustrated construction, there are seven switches corresponding to the seven indicators shown in FIGURE 2; but FIGURE 4 is partly broken away to increase the scale of the drawing and only 5 switches 121 and 124–127 are shown. For example, the upper switch 126 is connected with the top indicator 28. This indicator is preferably a light and it is located adjacent to indicia on the panel 26, as best shown in FIGURE 2. For example the upper indicator 28 is located adpacent to the word "danger" so that it will be understood that the lighting of the indicator 28 shows the press to be dangerously overloaded.

The next indicator 28, below the top one, is associated with the switch 126 and is located adjacent to the word "overload" to indicate that the press is overloaded, but not to a dangerous degree. The next indicator 28 on the panel 26, is associated with switch 125 and indicates that the press is fully loaded. Subsequent indicators coming down along the panel 26 indicates three-quarter, half, and one-quarter loads on the press. The lowermost indicator 28 has a light controlled by the switch 121 to show that power is on and that the indicators are, therefore, operative.

It will be understood that the panel 26 can be marked with other indicia and with indications on an increased number of steps in the loading of the press, or with fewer indications, if desired.

Each of the switches 121 and 124–127 is operated by pressure from the passage 48 and the construction of the switch 121 is shown in FIGURE 6. This switch construction is very similar to the construction of the part of the regulator 110 that is to the left of the passage 64 in FIGURE 5. Parts of the switch 121 that are the same as in the regulator construction are indicated by the same reference characters, but with a prime appended. A terminal 130 screws into the bushing 94' along the same threads as the plug 96'; and there is a spring 132 compressed between the terminal 130 and the plug 96'. A conductor from the signal light 28 which is connected with the terminal 130 is grounded through the spring 132, plug 96', ball 98', spring 100', contact element 102', washer 92' and manifold block 46 when the pressure in the manifold passage 64 is high enough to hold the elements of the switch 121 closed until there is a pressure drop in the switch and on the right hand side of the diaphragm 88.

When the press is not loaded and the ball 52 (FIGURE 3) is held against the seat 54 by the rod 30 and its associated structure, the pressure in the manifold passage 48 is sufficient to maintain all of the switches 121, 124–127 (FIGURE 4), and the other switches for the other signals 28 in closed position; that is, with the element 102' (FIGURE 6) in contact with the washer 92'. When the press is loaded and the side frame elongates so as to move the rod 30 upwardly, the ball valve 52 is opened by the fluid pressure in the passage 48 and the flow of pressure across the seat 54, and out through an exhaust passage 140 causes a pressure drop in the passage 48. The greater the elongation of the press in response to increased load, the greater the distance that the ball 52 can rise from the seat 54 and the more rapid is the flow of fluid from the passage 48 with resulting increase in pressure drop.

As the pressure in the manifold passage 48 decreases the switches are operated to light the signals 28. The first switch to operate lights the signal 28 for the one-quarter load indication (FIGURE 2) and as the pressure continues to decrease the signal 28 for the one-half load is lighted. Further decrease in pressure causes the switch 124 (FIGURE 4) to operate and light the signal 28 for three-quarter load; and continued decrease in pressure causes the switches 125, 126, and 127 to operate successively and light the signals 28 for the signals full, overload, and danger, respectively.

It will be understood that if the load on the press never exceeds three-quarters of capacity, the switch 124 will operate but the pressure will not decrease sufficiently to permit the springs in the switches 125, 126 and 127 to operate these switches. In order to have the pressure in the manifold passage 48 decrease to a certain value but not drop any further, it is necessary that the clearance between the ball 52 and the seat 54 be limited and that the clearance for escape of fluid should not be kept open too long.

Fluid is not supplied to the passage 48, through the regulators 110 and 116 as fast as it escapes past the ball 52, when the latter is allowed to move away from the seat 54. If it were, then there would be no decrease in pressure in the passage 48. Therefore the amount of fluid that escapes from the passage 48 and the resulting pressure which remains in the passage 48 when the valve 52 closes depends upon how fast the machine is operating and how long the load is on the frame and therefore capable of keeping the rod 30 raised so that the ball valve 52 can lift from its seat to permit escape of pressure.

The important consideration, in determining the rate at which the pressure drops in the passage 48, is not only the amount of clearance between the ball 52 and the seat 54, but also the volume of gas in the passage 48 and any spaces which communicate freely with this passage. The invention is adjusted, to compensate for a change in speed of the machine by changing the volume of fluid in a volume control chamber 150 (FIGURES 7–9) which communicates with the passage 48 through a port 152 (FIGURES 4 and 9) in the front of the manifold block 46.

The volume control chamber 150 is preferably cylindrical and it includes a piston 154 which can be moved to the right in FIGURE 9 by a screw 156 threaded through an end wall 158 which is attached to the side wall of the control chamber 150 by a circle of screws 160 threaded into the side wall of the chamber.

There is a cover 162 of a housing 164 which encloses the manifold block 46 and the volume control chamber 150. The front wall or cover 162 is clamped against the end wall 158 by the screws 160 and also by other screws 168 which thread into the end wall 158 but not into the cylindrical wall of the volume control chamber 150.

Rotation of the screw 156 in its threads in the end wall 158 causes the piston 154 to move to the right when the screw 156 is turned in one direction. There is no connection, however, between the screw 156 and the piston 154 for withdrawing the piston 154 toward the left, but this is not significant because the pressure from the passage 48 and passage 152 enters the volume control chamber 150 on the left side of the piston 154 and holds the piston 154 always in contact with the screw 156.

In the preferred embodiment there is a soft plastic ring 170 in the end of the volume control chamber 150 providing a stop for the piston 154 as it moves towards the right. There is a pin 172 extending inward from the wall of the volume control chamber 150 in the path of the piston 154 when this piston moves towards the left. One purpose of the pin 172 is to prevent the piston 154 from being blown out of the volume control chamber 150 if the end wall 158 is removed without first relieving the pressure in the manifold passage 48.

The diameter of the volume control chamber 150 and piston 154 is so large in proportion to the diameter of the passage 48 that a comparatively small axial movement of the piston 154 makes a significant change in the total volume of fluid contained in the combined volumes of the passages 48 and 152 and the part of the chamber 150 on the right of the piston 154.

In order to know the position of the piston 154 in the volume control chamber 150, there is an indicator 178 attached to a bracket 180 which is in turn attached to the front wall 162 of the housing 164. This indicator 178 is a counter with a stem 184 attached to a head 186 of the screw 156. Rotation of the screw head 186 turns the shaft 184 and rotates mechanism within the indicator 178 so as to turn cylinders 190 having numerals thereon.

In the preferred construction, the cylinder 190 which is toward the right in FIGURE 9 measures tenths of a turn of the screw head 186 and the shaft 184. The middle cylinder 190 measures complete turns, and the left hand cylinder 190 measures multiples of ten turns.

The indicator 178 moves axially as the screw head 186 moves and provision is made for the indicator 178 to be held against rotation but left free to move axially. The construction for obtaining this result is best shown in FIGURE 7. The indicator 178 has a base with flanges 192 which extend into channels in the bracket 180. These channels prevent any movement of the indicator 178 except axial movement.

The indicator 178 cannot come out at the ends of the channels because it is attached to the screw 156. For substantial extensions of the screw toward the left in FIGURE 9, part of the indicator 179 moves beyond the end of the bracket 180, but not enough to make any difference in the effectiveness of the guide and bearing surfaces which are provided by the channels in which the flanges 192 slide.

FIGURE 10 shows a table for determining the correct position for the system 154 in the volume control chamber for various speeds of operation of the machine. For example the construction of the control apparatus may be such that a zero reading on the indicator 178 is the proper setting for the screw 156 when the machine is operating at a speed of 200 strokes per minute, this being the maximum speed at which the machine is used.

If the speed of the machine is reduced to 175 strokes per minute, it may be necessary to give the screw 156 a half turn; that is, move it to an indication of .5 on the indicator 178. Likewise, a further reduction to 150 strokes per minute may require another half turn of the screw 156 in a direction to permit the piston 154 to move toward the left and thus increase the volume of fluid to compensate for the fact that at the slower speed the valve 52 (FIGURE 3) is open longer for the escape of fluid from the passage 48.

At a speed of 125 strokes per minute the setting of the indicator may be 1.5; and at 100 strokes per minute the indicator setting may be 2.0, as indicated by FIGURE 10. It will be understood that the values of this FIGURE are given merely by way of illustration. For the full stroke of the piston 154 shown in FIGURE 9, the maximum number of turns of the screw 156 is approximately 4 and the indicator 178 never uses the cylinder 90 furthest to the left for counting. However the construction is made so that it can be used for other screws and pistons in the event that the variation in speed of the machine requires a wider variation in the volume of the fluid.

The preferred embodiment of the invention has been illustrated and described, but changes and modifications can be made and some features can be used in different combination without departing from the invention as defined in the claims.

What is claimed is:

1. Load-responsive apparatus for a press or the like including in combination a pneumatic system containing gas under superatmospheric pressure, said system including a chamber and a gas inlet to the chamber with a reduced cross section for restricting flow of gas into the chamber, valve means responsive to the load on the press for changing the flow of gas out of the chamber and the pressure in said system, a plurality of switch devices communicating with the gas in the chamber of said system and operated thereby, different ones of the switch devices being responsive to different gas pressures in the chamber and having means to indicate varying loads on the press by their sequential operation, and means for changing the volume of the chamber in which the gas is contained to adjust the apparatus for repetitively operating machines of different cycle frequency.

2. The load-responsive apparatus described in claim 1 characterized by the valve means including a valve element, motion-transmitting means for rigid connection with a portion of the press remote from the valve element and movable with respect to the valve element in proportion to the stress on the frame of the press, and a self-leveling contact device interposed in the motion-transmitting means that operate the valve element, said self-leveling contact containing parts that move axially with respect to one another, a spring urging the parts to move in one direction, and a viscous liquid opposing rapid movement of the parts in either direction.

3. The load-responsive apparatus described in claim 1 characterized by the chamber of the pneumatic system having a header with space therein for the gas, and the load-responsive valve means including electric switches each of which has a movable element with a bias in one direction, the movable element being exposed to gas pressure in a chamber that connects with the space in the header, different ones of the switches having a different bias so that the switches operate at different gas pressures, and a chamber having a movable wall which is adjustable to change the volume of the chamber on one side of the wall, the chamber on that side of the wall being in communication with the gas space of the header and constituting the means for adjusting the volume of the chamber in which the gas is contained.

4. The load-responsive apparatus described in claim 1 characterized by the valve means including a valve element and a motion-transmitting element for rigid connection with a part of the frame on the press and that holds the valve element in a closed position when the press is not loaded, the valve element being movable into progressively wider open positions as the motion-transmitting element moves in response to displacement of said part of the frame with elongation of the frame in response to the load on the press, the movement of the valve element in the wider positions permitting escape of gas and resulting reduction in pressure in the pneumatic system, the passage for the supply of gas to the pneumatic system being restricted to limit the supply of new gas to the system to a rate lower than the rate at which the gas escapes from the system when the valve element opens in response to movement of the motion-transmitting element resulting from frame elongation within the range of loads for which the apparatus is intended to be used.

5. The load-responsive apparatus described in claim 4 characterized by different indicators responsive to operation of the different switches for indicating the degree of displacement of the part of the frame to which said motion-transmitting element is connected, and a restriction that limits the supply of gas to the pneumatic system to a rate less than the rate of escape past the valve element corresponding to an elongation of the frame which operates the first of said indicators.

6. The load-responsive apparatus described in claim 5 characterized by each of the different switches having a spring for moving it in one direction and having a movable wall actuator exposed to the pressure in said pneumatic system for moving the switch in the opposite direction against the force of the spring.

7. The load-responsive apparatus described in claim 1 characterized by the means for changing the volume of the space including a movable wall, a pressure regulator for supplying gas at reduced pressure to said space to build up the pressure in said space to the delivery pressure of the regulator regardless of the volume of the space, and means for adjusting the delivery pressure on the regulator.

8. The load-responsive apparatus described in claim 1 characterized by the space in which the gas is contained including a chamber, means for changing the volume of the space including a movable wall of the chamber, cam means that shift the position of the movable wall, and an indicator for denoting changes in the position of the movable wall and the resulting addition to or subtraction from the volume of the chamber.

9. The load-responsive apparatus described in claim 8 characterized by the chamber being a cylinder and the cam means being a screw, and the indicator including a counter connected with the screw and responsive to fractional turns of the screw to change the reading of the counter.

10. The load-responsive apparatus described in claim 9 characterized by the movable wall being a piston in the cylinder, and the counter including a shaft operably connected with the screw, a plurality of cylinders in the counter, including one cylinder with indicia for indicating fractions of a turn of the screw, and another cylinder for indicating full turns of the screw.

11. The load-responsive apparatus described in claim 10 characterized by the counter being axially movable with the screw and including a housing, restraining means for preventing rotation of the counter housing when the screw rotates, said restraining means including a relatively fixed guide in which the housing is movable axially and bearing surfaces on the guide for preventing rotation of the counter housing.

References Cited

UNITED STATES PATENTS

| | | | |
|---|---|---|---|
| 2,455,285 | 11/1948 | Versan | 73—88 |
| 2,522,450 | 9/1950 | Johansen. | |
| 2,622,440 | 12/1952 | Friedman | 73—88 |

RICHARD C. QUEISSER, *Primary Examiner.*

J. W. MYRACLE, *Assistant Examiner.*

U.S. Cl. X.R.

100—53, 99